G. SWEET.
Harvester-Platform.
No. 205,441.  Patented June 25, 1878.
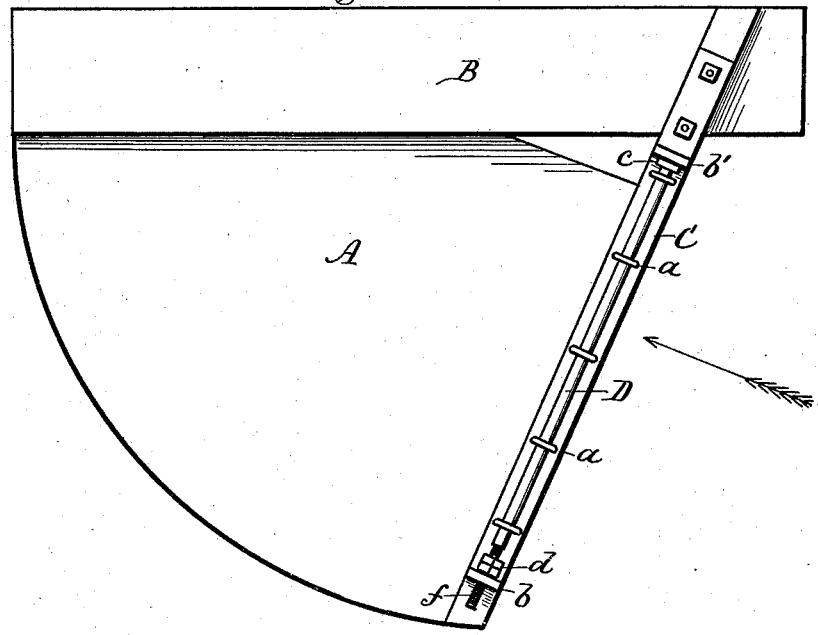
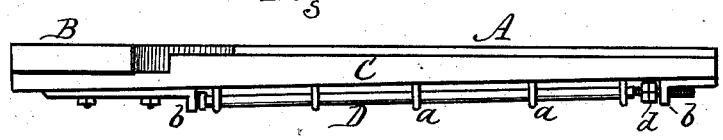
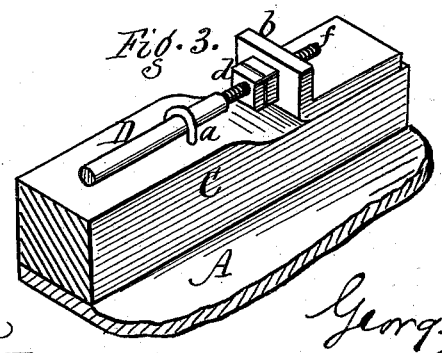
Attest.  Inventor.
Jacob Spahn  George Sweet,
R. E. White  pr R. F. Osgood
  Atty.

UNITED STATES PATENT OFFICE.

GEORGE SWEET, OF DANSVILLE, NEW YORK.

IMPROVEMENT IN HARVESTER-PLATFORMS.

Specification forming part of Letters Patent No. 205,441, dated June 25, 1878; application filed December 24, 1877.

*To all whom it may concern:*

Be it known that I, GEORGE SWEET, of Dansville, in the county of Livingston and State of New York, have invented a certain new and useful Improvement in Harvester-Platforms; and I do hereby declare that the following is a full, clear, and exact description of the construction and operation of the same, reference being had to the accompanying drawings, in which—

Figure 1 is a plan view of a harvester-platform turned bottom upward and showing my improvement. Fig. 2 is an elevation of the same turned right side up, looking in the direction of the arrow, Fig. 1. Fig. 3 is a detail view in perspective.

In ordinary harvester-platforms, after long use, the rear outer end will sag or become depressed, and materially interfere with the action of the rake and other connecting parts, producing strain and causing bad work. This is owing to there being no support to the rear outer corner of the platform.

The object of my improvement is to provide means for straightening up or elevating the rear end of the platform when it becomes thus depressed; and the invention consists of an expanding rod combined with the rear tie-piece of the platform, provided with nuts or equivalent devices by which said rod may be operated, said rod being secured to said beam by staples intermediate of its length, in order that the rod and beam may be held close together and brace each other.

A represents an ordinary quadrant or segmental platform. B is the bar by which the platform is connected with the machine, and it is provided with fingers and knives. (Not shown in the drawing.) C is the rear tie or frame-piece which supports the platform.

I combine with this tie-piece a stiff metallic rod, D, as follows: The rod rests loosely in suitable bearings $a\ a$, so as to be capable of an endwise movement, while at the same time the rod and the beam are held close to each other, in order that the expansion of the rod may cause its proper endwise thrust, instead of simply bowing or bending said rod; and it is situated between two head-blocks or abutments, $b\ b'$, secured fast to the tie-piece at opposite ends. At one end of the rod is a head, $c$, or other device, which prevents it from turning, while at the opposite end are one or more nuts, $d$, turning on a screw-thread, $f$, of the rod, and resting against the abutment $b$, so that as the nut or nuts are turned the rod will be thrown outward endwise, and thus expanded. This expansion or increase in length of the rod has the effect of raising the outer rear corner of the platform, so that if the latter has sagged, as before described, it can readily be brought up to the level again, or elevated even above it to any desired height. By this means all the sag or depression in the platform is compensated for, and the machine is thereby kept in proper order.

The device is cheap, simple, and effective.

Ordinary quadrant or segmental platforms, such as shown and described, have no supporting-wheel at the outer rear corner, and hence are unsupported, and have to depend upon the natural stiffness of the platform to keep them in position. Under ordinary circumstances it is difficult, if not impossible, to keep them at proper level. My invention remedies this difficulty, as the outer end can be straightened up at any time by simply expanding the rod outward.

I am aware that trusses have before been used in square platforms having supporting-wheels at both ends, said trusses serving simply to sustain or stiffen the platform; but such trusses, contracting or drawing inward, would depress instead of raise a platform unsupported at the outer end, and therefore would defeat the object of my invention.

Various modifications may be made without changing the nature of the invention. More than one rod may be used, if desired, or the rod may be divided into sections or short lengths, each operated by some suitable power. Other devices than nuts may be employed to operate the rod—for instance, wedges, keys, cams, or levers.

I do not claim a truss for stiffening and staying the platform; but

I claim—

In combination with the rear tie of a harvester-platform, the brackets or abutments $b$ $b'$ near the corners of the outer end, the rod D, having screw-threaded ends $f$ extending through the bracket or abutment $b$, and provided on the inner side of said bracket or abutment with one or more nuts, $d$, and the staples $a$, secured at intervals to the rear tie, through which the rod D freely passes, substantially as and for the purpose specified.

In witness whereof I have hereunto signed my name in the presence of two subscribing witnesses.

GEORGE SWEET.

Witnesses:
  CHARLES W. LEONARD,
  CHARLES JEFFERY.